(12) United States Patent
Ackerman et al.

(10) Patent No.: US 11,034,506 B2
(45) Date of Patent: Jun. 15, 2021

(54) DISPENSING SYSTEM AND METHOD OF MAKING AND USING THE SAME

(71) Applicant: Cryovac, LLC, Charlotte, NC (US)

(72) Inventors: David L. Ackerman, Greenville, SC (US); Hubert J. Cook, Simpsonville, SC (US); Robert M. Edge, Simpsonville, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/499,347

(22) PCT Filed: Mar. 28, 2018

(86) PCT No.: PCT/US2018/024757
§ 371 (c)(1),
(2) Date: Sep. 30, 2019

(87) PCT Pub. No.: WO2018/183442
PCT Pub. Date: Oct. 4, 2018

(65) Prior Publication Data
US 2021/0039873 A1    Feb. 11, 2021

Related U.S. Application Data

(60) Provisional application No. 62/478,186, filed on Mar. 29, 2017.

(51) Int. Cl.
*B65D 83/00* (2006.01)
*A47J 47/01* (2006.01)

(52) U.S. Cl.
CPC .......... *B65D 83/0072* (2013.01); *A47J 47/01* (2013.01); *B65D 2583/005* (2013.01)

(58) Field of Classification Search
CPC . B65D 83/0072; B65D 2583/005; A47J 47/01
See application file for complete search history.

(56) References Cited

U.S. PATENT DOCUMENTS 3,938,706 A * 2/1976 Cohen ................ B65D 83/0072
222/83.5
4,875,587 A   10/1989 Lulham et al.
(Continued)

FOREIGN PATENT DOCUMENTS

WO     9700818 A1    1/1997
WO     2016018694 A2  2/2016

*Primary Examiner* — Jeremy Carroll
(74) *Attorney, Agent, or Firm* — Jon M. Isaacson (57) ABSTRACT

A dispenser (5) comprising a body (10) and a removable magazine (11) in which a product pouch (175) is held. The body (10) and magazine (11) form an asymmetric interior volume similar to the shape of the pouch (175). The dispenser (5) includes a grip (28) and actuator (30) at an actuator end and a ratcheting drive system disposed on opposite sides of the interior volume. The drive system applies a symmetric pushing force on a squeeze pusher (32) that is slidably disposed in the interior volume. The squeeze pusher (32) applies pressure to the pouch (175) to dispense the product. The magazine (11) and pouch (175) may be ejected once the squeeze pusher (32) is ratcheted to the dispensing end. Once ejected, the squeeze pusher (32) is disengaged from the drive system. A magazine (11) with a new pouch (175) may be inserted into the body (10), which automatically positions the squeeze pusher (32) at the actuating end and reengages the drive system for further dispensing.

10 Claims, 7 Drawing Sheets

(56) References Cited

U.S. PATENT DOCUMENTS

| | | | |
|---|---|---|---|
| 5,023,121 A | 6/1991 | Pockat et al. | |
| 5,024,044 A | 6/1991 | Friedrich et al. | |
| 5,356,037 A * | 10/1994 | Harrold | B65D 83/0005 |
| | | | 222/105 |
| 6,395,321 B1 | 5/2002 | Shaft et al. | |
| 6,476,137 B1 | 11/2002 | Longo | |
| 6,938,799 B1 | 9/2005 | Berntsen et al. | |
| 6,983,839 B2 | 1/2006 | Bertram et al. | |
| 7,055,683 B2 | 6/2006 | Bourque et al. | |
| 10,765,242 B2 * | 9/2020 | Cook | B65D 83/0072 |
| 2002/0166875 A1 | 11/2002 | Sokoloff | |
| 2003/0152669 A1 | 8/2003 | Vadhar et al. | |
| 2006/0093765 A1 | 5/2006 | Mueller | |
| 2018/0029067 A1* | 2/2018 | Cook | B05C 17/00506 |
| 2019/0246821 A1* | 8/2019 | Cook | B05C 17/01 |

\* cited by examiner

DISPENSING SYSTEM AND METHOD OF MAKING AND USING THE SAME

FIELD OF THE INVENTION

The presently disclosed subject matter relates generally to a system for dispensing a packaged product. As set forth in more detail herein below, the disclosed packaging system includes an outer dispenser and an inner flexible package comprising a frangible seal. Methods of making and using the disclosed system are also included within the scope of the presently disclosed subject matter.

BACKGROUND

In food service, and in particular in the field of high volume fast food service, it is frequently desired that food be supplemented by condiments such as ketchup, mustard, mayonnaise, and the like. It has recently become customary in retail fast service chain food outlets to use a wide variety of devices to dispense a measured quantity of flowable product. For example, a conventional, trigger-activated dispensing gun assembly has commonly been used in "back of the restaurant" operations for discharging one or more condiments or sauces. The gun assembly dispenses a quantity of a condiment with each pull of a gun trigger. The conventional gun assembly includes a cylindrical dispenser that houses the condiment and cooperates with a trigger in a gun to dispense the condiment out of a nozzle. However, the gun, cylindrical dispenser, and nozzle are typically disassembled and cleaned each time the dispenser is emptied and refilled. In addition, the conventional gun assembly typically can be messy, as condiment can drip from the nozzle between uses. Furthermore, the rod portion of the dispensing gun is cumbersome and problematic for users.

Moreover, conventional dispenser designs tend to be asymmetric in shape with a trigger mechanism generally disposed to one side or another of the main dispenser body. This asymmetry introduces a few disadvantages. For instance, asymmetric dispensers are bulky and difficult to store. The asymmetry may make it awkward for left- and right-handed users to use the dispenser at the same point of use. Also, an asymmetric drive mechanism may not apply a uniform dispensing force on a product to be dispensed, and in some instances may cause jamming. Therefore, it would be beneficial to provide a dispensing system that addresses the shortcomings in the prior art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the presently disclosed subject matter are directed to a dispenser for dispensing product such as condiments in food service industries. In one embodiment, a dispenser may comprise a body with an actuator end and a dispensing end and a plurality of walls defining an interior space. The body may include an asymmetric shape wherein a distance between opposed first and second walls is greater than a distance between opposed third and fourth walls of the body. The body may further comprise a grip extending from the actuator end that is coupled to and spans a distance between the first and second walls. The dispenser may comprise an actuator movably attached to the body and biased to a home position away from the grip and movable from the home position towards the grip. The dispenser may comprise a first row of driver teeth extending longitudinally at an interior of the first wall, the first row of driver teeth movably coupled to the actuator with a first lever such that upon moving the actuator towards the grip, the first row of driver teeth moves towards the dispensing end. Similarly, a second row of driver teeth may extend longitudinally at an interior of the second wall, the second row of driver teeth movably coupled to the actuator with a second lever such that upon moving the actuator towards the grip, the second row of driver teeth moves towards the dispensing end. The dispenser may comprise a squeeze pusher disposed within the interior space of the body, the squeeze pusher comprising a first driver pawl movably attached to the squeeze pusher and engageable with the first row of driver teeth and a second driver pawl movably attached to the squeeze pusher and engageable with the second row of driver teeth. When the actuator is moved from the home position towards the grip, the first and second rows of driver teeth may respectively engage the first and second driver pawls and cause the squeeze pusher to move relative to the body from a first position to a second position in a direction from the actuator end to the dispensing end. The first and second rows of driver teeth may be disposed at opposite sides of the interior space.

The dispenser may further comprise a first row of retainer teeth fixedly extending longitudinally at the interior of the first wall and a second row of retainer teeth fixedly extending longitudinally at the interior of the second wall. The squeeze pusher may further comprise first and second retainer pawls movably attached to the squeeze pusher, the first retainer pawl engageable with the first row of retainer teeth and the second retainer pawl engageable with the second row of retainer teeth. After the actuator is moved from the home position towards the grip, the first and second retainer pawls respectively engage the first and second rows of retainer teeth to retain the squeeze pusher at the second position. Moreover, after the actuator is moved from the home position towards the grip, the actuator returns to the home position and the first and second rows of driver teeth respectively disengage the first and second driver pawls and return towards the actuating end. The first and second rows of retainer teeth may also be disposed at opposite sides of the interior space. The first and second rows of driver teeth may have a common first tooth profile while the first and second rows of retainer teeth may have a common second tooth profile that is different than the first tooth profile.

The dispenser may further comprise a third row of driver teeth extending longitudinally at the interior of the first wall, the third row of driver teeth movably coupled to the actuator with the first lever such that upon moving the actuator towards the grip, the third row of driver teeth moves towards the dispensing end. The dispenser may further comprise a fourth row of driver teeth extending longitudinally at the interior of the second wall, the fourth row of driver teeth movably coupled to the actuator with the second lever such that upon moving the actuator towards the grip, the fourth row of driver teeth moves towards the dispensing end. The dispenser may further comprise a third row of retainer teeth fixedly extending longitudinally at the interior of the first wall and a fourth row of retainer teeth fixedly extending longitudinally at the interior of the second wall. The first and third rows of driver teeth may be coupled to each other on a first driver body that is coupled to the first lever and the second and fourth rows of driver teeth may be coupled to each other on a second driver body that is coupled to the second lever. In one embodiment, the first row of driver teeth and the first row of retainer teeth are disposed at a first corner of the interior space, the second row of driver teeth and the second row of retainer teeth are disposed at a second corner of the interior space, the third row of driver teeth and the third row of retainer teeth are disposed at a third corner of the interior space, and the fourth row of driver teeth and the fourth row of retainer teeth are disposed at a fourth corner of the interior space.

The dispenser may further comprise a removable magazine sized and shaped to fit within the body, the magazine being insertable into the body from the dispensing end, the body and the magazine defining the interior space. The magazine may comprise a spout aperture at the dispensing end, the spout aperture including a restrictor.

In another embodiment, a dispenser may comprise a body comprising an actuator end and a dispensing end and a longitudinal axis extending therebetween, the body further comprising an exterior surface defining an interior volume having a first width in a first direction perpendicular to the longitudinal axis and a second longer width in a direction perpendicular to the longitudinal axis and perpendicular to the first direction. The dispenser may comprise a grip extending from the actuator end and being coupled to and spanning the exterior surface along the second direction. The dispenser may comprise an actuator movably attached to the body and biased to a home position away from the grip and movable from the home position towards the grip. The dispenser may comprise a squeeze pusher disposed within the interior space of the body and moveable along the longitudinal axis. The dispenser may comprise a ratcheting drive system extending from the actuator end towards the dispensing end, the ratcheting drive system engaged with opposite sides of the squeeze pusher along the second direction and operable to move the squeeze pusher incrementally towards the dispensing end with each movement of the actuator from the home position towards the grip. The dispenser may be symmetric about a first plane extending through the longitudinal axis and the first direction and the dispenser is also symmetric about a second plane extending through the longitudinal axis and the second direction.

In one embodiment, the ratcheting drive system may comprise a first row of driver teeth extending longitudinally within the interior volume and engaged with a first side of the squeeze pusher, the first row of driver teeth movably coupled to the actuator with a first lever such that upon moving the actuator towards the grip, the first row of driver teeth moves towards the dispensing end. Similarly, the ratcheting system may comprise a second row of driver teeth extending longitudinally within the interior volume and engaged with a second side of the squeeze pusher opposite the first side of the squeeze pusher along the second direction, the second row of driver teeth movably coupled to the actuator with a second lever such that upon moving the actuator towards the grip, the second row of driver teeth moves towards the dispensing end. The ratcheting system may further comprise a first row of retainer teeth extending longitudinally within the interior volume and engaged with the first side of the squeeze pusher and a second row of retainer teeth extending longitudinally within the interior volume and engaged with the second side of the squeeze pusher. The squeeze pusher may further comprise a plurality of driver pawls respectively engageable with the driver teeth and a plurality retainer pawls respectively engageable with the retainer teeth, the driver pawls and retainer pawls being movably attached to the squeeze pusher. When the actuator is moved from the home position towards the grip, the first and second rows of driver teeth respectively engage the driver pawls and cause the squeeze pusher to move relative to the body from a first position to a second position in a direction from the actuator end to the dispensing end. After the actuator is moved from the home position towards the grip, the retainer pawls respectively engage the first and second rows of retainer teeth to retain the squeeze pusher at the second position. Moreover, after the actuator is moved from the home position towards the grip, the actuator returns to the home position and the first and second rows of driver teeth respectively disengage the driver pawls and return towards the actuating end.

In another embodiment, a dispenser may comprise a body comprising an actuator end and a dispensing end and a plurality of walls, the body including an asymmetric shape wherein a distance between opposed first and second walls is greater than a distance between opposed third and fourth walls of the body. The dispenser may comprise a magazine sized and shaped to fit within the body and having an asymmetric shape, the magazine being insertable into the body from the dispensing end, the body and the magazine defining an interior space. The dispenser may comprise a grip extending from the actuator end and being coupled to and spanning a distance between the first and second walls. The dispenser may comprise an actuator movably attached to the body and biased to a home position away from the grip and movable from the home position towards the grip. The dispenser may comprise a squeeze pusher disposed within the interior space of the body and moveable along the longitudinal axis. The dispenser may comprise a ratcheting drive system extending from the actuator end towards the dispensing end, the ratcheting drive system engaged with opposite sides of the squeeze pusher at an inside surface of the first and second walls and operable to move the squeeze pusher incrementally towards the dispensing end with each movement of the actuator from the home position towards the grip. When the magazine is removed from the body, the squeeze pusher may be disengaged from the ratcheting drive system. When the magazine is moved into the body, the squeeze pusher may be moved to the actuator end and engaged with the ratcheting drive system. When the squeeze pusher is ratcheted to the dispensing end, the magazine may be ejected from the body.

In one embodiment, the ratcheting drive system may comprise a row of driver teeth extending longitudinally within the interior space and engaged with a driver pawl that is movably attached to the squeeze pusher. The row of driver teeth may be movably coupled to the actuator with a lever such that upon moving the actuator towards the grip, the row of driver teeth moves towards the dispensing end. The ratcheting drive system may further comprise a row of retainer teeth fixedly extending longitudinally within the interior space and engaged with a retainer pawl that is movably attached to the squeeze pusher. The driver pawl and retainer pawl may be independently movable to allow each pawl to slide over its respective row of teeth in a direction from the actuating end towards the dispensing end but not from the dispensing end towards the actuating end.

In one embodiment, the squeeze pusher further comprises a pawl controller that is movably attached to the squeeze pusher. The driver pawl and retainer pawl may be coupled to the pawl controller such that when the pawl controller is in a first position, the pawl controller moves the pawls into engagement with their respective rows of teeth and when the pawl controller is in a second position, the pawl controller moves the pawls out of engagement with their respective rows of teeth. When the magazine is fully inserted into the body, the magazine holds the pawl controller in the first position and when the magazine is removed from the body, the pawl controller moves to the second position.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

I. General Considerations

The presently disclosed subject matter provides a dispensing system and method for dispensing a product onto one or more areas (one or more spots of mustard dispensed on a hamburger bun, for example). As set forth in more detail herein, the disclosed packaging system includes a non-cylindrical dispenser comprising a body, grip, and actuator that are symmetric about at least two planes extending through a longitudinal axis of the dispenser. The dispenser may include a body with an interior that is shaped in roughly the same or similar aspect ratio as a pouch housing a product to be dispensed.

II. Definitions

Following long standing patent law convention, the terms "a", "an", and "the" refer to "one or more" when used in the subject application, including the claims. Thus, for example, reference to "a film" includes a plurality of such films, and so forth.

The term "condiment" as used herein refers to (but is not limited to) sauces, salad dressing, emulsions, frosting, icing, ketchup, mustard, guacamole, sour cream, salsa, nacho cheese, taco sauce, barbecue sauce, tartar sauce, mayonnaise, jams, jellies, spices, and the like. In some embodiments, the term "condiment" can include any and all additives that a user can choose to add to any food item for any purpose, e.g. for organoleptic, processing, or preservative purposes.

As used herein, the term "exterior" refers to the outside portion of a dispenser, body, or other article.

As used herein, the term "film" can be used in a generic sense to include plastic web, regardless of whether it is film or sheet.

The term "filled" as used herein refers to an item (such as a pouch) that has been occupied with a product in a manner consistent with a commercial filling operation. Thus, a pouch may or may not be 100% filled.

The term "flexible" is used herein to refer to materials that are pliable and easily deform in the presence of external forces. In some embodiments, suitable flexible materials can be characterized by a modulus of less than about 50,000 PSI and in some embodiments less than 40,000 PSI (ASTM D-872-81).

The term "frangible seal" as used herein refers to a seal that is sufficiently durable to allow normal handling and storage, but ruptures or substantially ruptures under applied pressure. In some embodiments, suitable frangible seals can have a peel strength of from about 0.5 to less than about 5 pounds/inch, as measured by ASTM F88 (incorporated by reference in its entirety herein).

The term "interior" as used herein refers to the inside portion of an article, such as a pouch or a dispenser or body.

The term "polymeric film" as used herein refers to a thermoplastic material, generally in sheet or web form, having one or more layers formed from polymeric or other materials that are bonded together by any conventional or suitable method, including one or more of the following: coextrusion, extrusion coating, lamination, vapor deposition coating, and the like.

As used herein, the term "pouch" refers to any of the wide variety of containers known in the art, including (but not limited to) bags, packets, packages, and the like.

As used herein, the term "seal" refers to any seal of a first region of an outer film surface to a second region of an outer film surface, including heat or any type of adhesive material, thermal or otherwise. In some embodiments, the seal can be formed by heating the regions to at least their respective seal initiation temperatures. The sealing can be performed by any one or more of a wide variety of methods, including (but not limited to) using a heat seal technique (e.g., melt-bead sealing, thermal sealing, impulse sealing, dielectric sealing, radio frequency sealing, ultrasonic sealing, hot air, hot wire, infrared radiation).

The term "valve" as used herein refers to any device by which the flow of material can be started, stopped, rerouted or regulated by a movable part that opens, closes, or partially obstructs a passageway through which the material flows. In some embodiments, a suitable valve can comprise (but is not limited to) an umbrella valve, duckbill valve, reed valve, ball valve, flapper valve, poppet valve, Gott valve, check valve, or any suitable combination thereof.

Any direction referred to herein, such as "top," "bottom," "left," "right," "upper," "lower," and other directions and orientations are described for clarity in reference to the figures and are not to be limiting. It is to be understood that the films or systems described herein can be used in a wide variety of directions and orientations.

All compositional percentages used herein are presented on a "by weight" basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Disclosed Dispensing System

Figure 1:
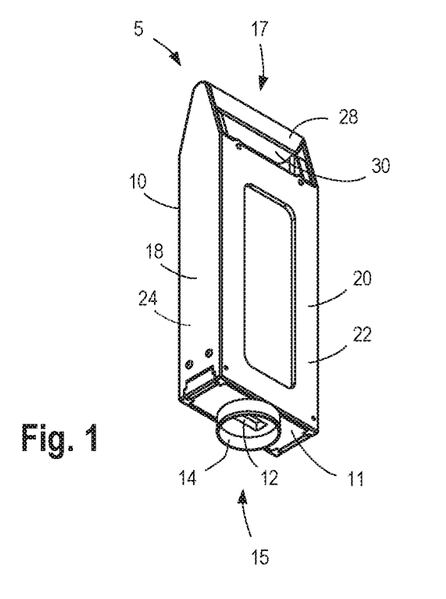
FIG. 1 is an isometric view of a dispenser viewed from a dispensing end and without an optional discharge unit in accordance with some embodiments of the presently disclosed subject matter.
Figure 2:
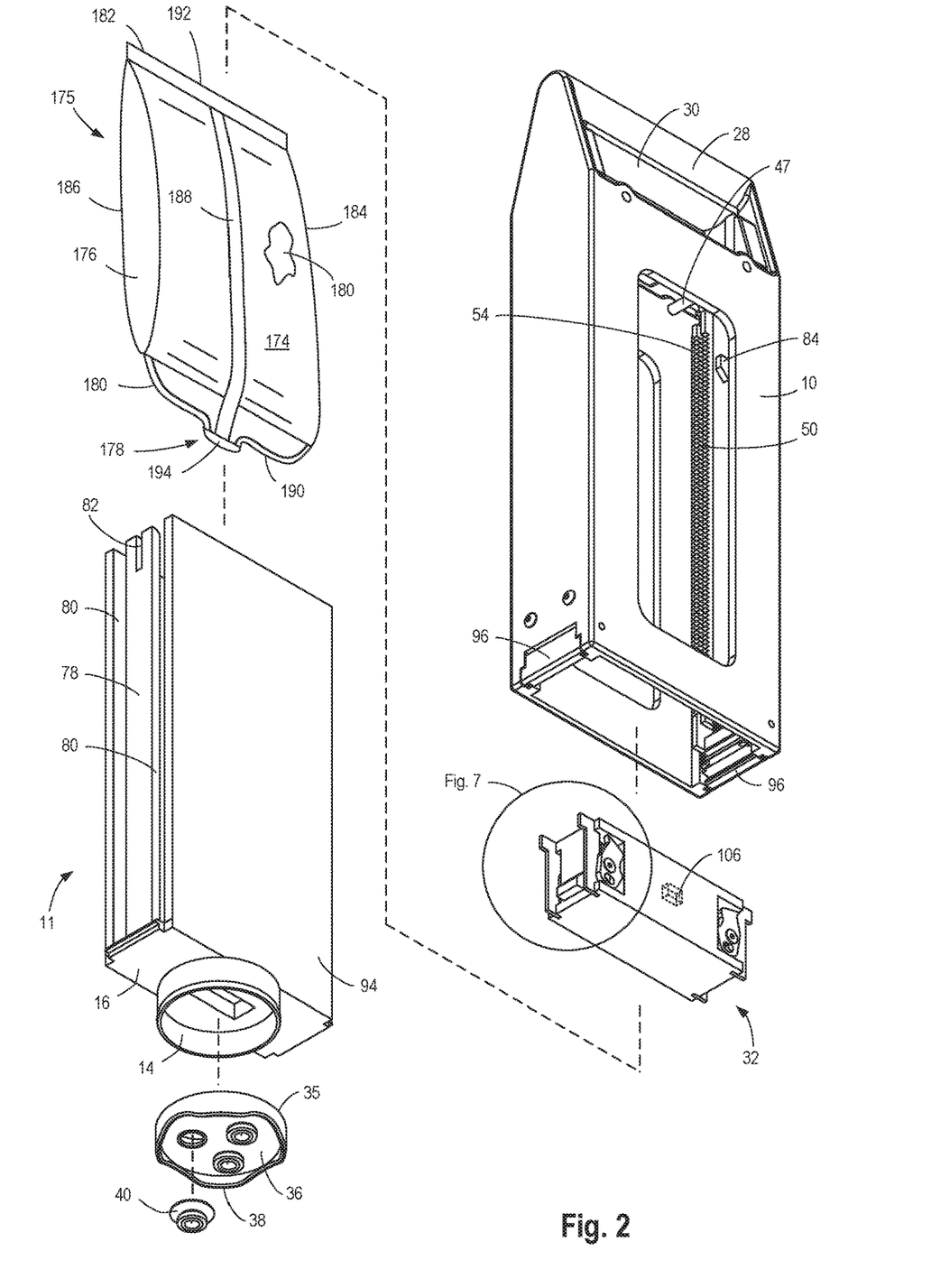
FIG. 2 is an exploded isometric view of a dispenser viewed from a dispensing end and without an optional discharge unit in accordance with some embodiments of the presently disclosed subject matter.
Figure 3:
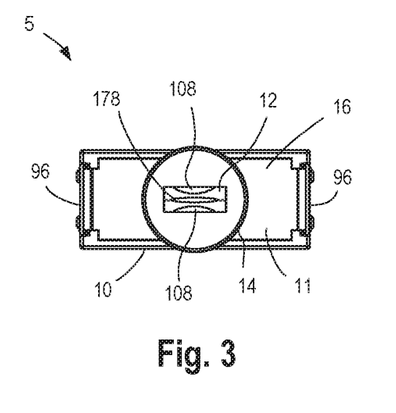
FIG. 3 is bottom view of a dispenser from a dispensing end in accordance with some embodiments of the presently disclosed subject matter.

As illustrated in FIG. 1 and elsewhere, embodiments of the disclosed dispenser 5 comprise a body 10 shaped and configured to hold a pouch 175 and to dispense a portion of product 180 from the pouch 175. The dispenser 5 includes an aperture 12 through which a spout 178 of pouch 175 may protrude to dispense the product 180. For example, FIG. 3 shows a view of the dispenser 5 looking from a dispensing end 15 and the spout 178 is visible in the aperture 12. Product 180 that is dispensed from dispenser 5 exits aperture 12 and spreads to fill a diffuser 14 that is adapted to receive a discharge unit 35 as shown in FIG. 2. In the illustrated embodiment, the diffuser 14 is formed as an extension of end plate 16 located at a dispensing end 15 of a magazine 11 that is insertable into the body 10. The diffuser 14 may be molded as part of the magazine 11. Alternatively, diffuser 14 and/or the end plate 16 may be a separate component that is attached to magazine 11. In the illustrated embodiment, the body 10 and magazine 11 include a rectilinear cross section and together form opposed narrow sides 18, 20 and opposed wide sides 22, 24 of the dispenser 5. That is, the distance between sides 22 and 24 is smaller than a distance between the sides 18 and 20. The dispenser 5 also includes an actuator end 17 opposite the dispensing end 15. A grip 28 and actuator 30, which is operated by a user to dispense product 180 are disposed at the actuator end 17. The interior 26 of the body 10 and magazine 11 are sized to accommodate a pouch 175 containing product 180. As described below, pouch 175 has a generally flat shape defined by panels 174, 176. Consequently, the interior 26 of the dispenser 5 may have an elongated shape roughly corresponding to the shape of the pouch 175. In one embodiment, the rectangular shape permits a pouch 175 to be inserted vertically into the magazine 11 with the magazine 11 and inserted pouch 175 then insertable into the body 10. In one embodiment, the dispenser 5 includes a release mechanism for automatically ejecting an emptied pouch 175 and the magazine 11 from the body 10. In one embodiment, the dispenser 5 includes a reset mechanism for automatically engaging internal ratcheting drive components for dispensing product 180 from a newly inserted, filled pouch 175.

As set forth herein above, pouch 175 comprising product 180 is housed within the interior 26 of dispenser 5. In some embodiments, pouch 175 is constructed from any of the wide variety of polymeric materials known and used in the art. In some embodiments, pouch 175 comprises at least one frangible seal to enable product 180 to exit the pouch in response to increased pressure. However, pouch 175 is not limited and can be any pouch known and used in the art. In one or more embodiments, the pouch may be as described in commonly assigned patent application PCT/US2015/041539, filed on Jul. 22, 2015 and published as WO/2016/018694, the contents of which are hereby incorporated by reference herein.

In the embodiment illustrated in FIG. 2, pouch 175 comprises first and second panels 174, 176 that are sealed together at a first transverse seal 180, a second transverse seal 182, a first side fold 184, a second side fold 186, a longitudinal seal 188, a first pouch end 190, and a second pouch end 192. Seals 180, 182, 188 can be formed using any suitable method, known and used in the art, including e.g. the use of heat, pressure, adhesive, and/or mechanical closure. As shown, first transverse seal 180 does not span first pouch end 190 and pouch spout 178. Rather, in some embodiments, pouch spout 178 includes frangible seal 194 positioned between the first and second panels 174, 176 using a heat seal, ultrasonic seal, static seal, RF seal, adhesive, or a combination thereof. Frangible seals are known to those of ordinary skill in the packaging art. See, for example, U.S. Pat. No. 6,983,839 and U.S. Patent Application Publication No. 2006/0093765, the entire disclosures of which are hereby incorporated by reference.

In some embodiments, frangible seal 194 may include a peelable sealant comprising any suitable sealant known in the art, e.g. DuPont APPEEL® resins such as those based on EVA, modified EVA, ethylene/acrylate copolymer, or modified ethylene/acrylate copolymer; blends of immiscible polymers, such as polyethylene and polybutylene; polyethylene, such as low density polyethylene and/or EVA copolymers blended with polypropylene, polyethylene blended with polybutene-1, random propylene/ethylene copolymer blended with polybutene-1, EVA or LDPE blended with polypropylene, LDPE blended with EVA and polypropylene, to introduce a molecular incompatibility into the sealant layer. It is believed that the molecular incompatibility creates discontinuities that reduce the force necessary to rupture the seal. Alternatively or in addition, the sealant can be printed in a pattern on a surface of the film. Alternatively or in addition, the peelable sealant can implemented as a separate label that is disposed between panels 174, 176. Typical seal strengths of peelable sealant can in some embodiments be less than about 5 pounds/inch in accordance with ASTM F88-05. A peelable sealant will typically allow the user to open the seal with relatively little effort (e.g. by advancing a squeeze roller 32 within the body interior). In some cases, peelable sealant can peel away from the surface to which it is adhered. Alternatively, a rupture of the sealant (cohesive failure) or breakage of the sealant and delamination along an adjacent layer interface can occur. See, for example, U.S. Pat. Nos. 4,875,587; 5,023,121; 5,024,044; 6,395,321; 6,476,137; 7,055,683; and 2003/0152669, the entire disclosures of which are hereby incorporated by reference herein.

In one or more embodiments, dispenser 5 comprises discharge unit 35 connected to diffuser 14 through which packaged product is dispensed. As shown in FIG. 2, discharge unit 35 comprises at least one valve 40 through which packaged product 180 can be dispensed. The illustrated discharge unit 35 is sized and shaped to mate to diffuser 14. FIG. 2 illustrates bottom face 36 of discharge unit 35 into which the valves 40 are inserted. In some embodiments, the bottom face 36 of the discharge unit comprises lip 38 to facilitate flow of the packaged product out of the dispenser 5 and to minimize messes. In addition, in some embodiments, lip 38 can function to support the package in an upright position, which may help prevent the valves 40 from contacting work surfaces or other potential sources of contamination.

In the illustrated embodiment, the discharge unit 35 and the diffuser 14 are circular in shape and accommodate three valves 40. Other shapes are permissible. For instance, where five valves 40 are used, the diffuser 14 and discharge unit 135 may have a pentagonal shape. Other shapes, such as triangular, elliptical, rectilinear, star shaped, and the like accommodating one or more valves 40 are contemplated. In some embodiments, the discharge unit 135 may be secured to the diffuser 14 with a coupling mechanism that includes, for example, screw threads, snap fit, bayonet mount or any connection mechanism known and used in the art. It should be appreciated that in some embodiments discharge unit 35 and diffuser 14 can be combined into a single component. Such a combination may be desirable for reducing part count and material costs. However, separating the diffuser 14 and discharge unit 35 into separate parts may offer advantages such as adaptability for different dispensed products and ease of cleaning. In one embodiment, flow-through aperture 12 in end plate 16 includes a valve 40 and may or may not include diffuser 14.

Valve 40 can be of any suitable variety known in the art, and can have at least one passageway to allow packaged product 180 to exit the pouch 175. Valve 40 can be constructed in any suitable shape, e.g. circular, square, oval, and the like. Valve 40 can be of any suitable type, such as an umbrella valve, gate valve, duckbill valve, reed valve, ball valve, flapper valve, poppet valve, Gott valve, check valve, or any suitable combination thereof. In some embodiments, valve 40 can be optional when dispensing high viscosity, thixotropic, or non-Newtonian fluids, but are generally required for lower viscosity, Newtonian fluids. In addition, discharge unit 35 can comprise three valves as shown in the Figures or any number of valves, depending on the product to be dispensed, i.e., one, two, four or more. Valves 40 may be formed integrally into the end plate 16 and/or discharge unit 35, through techniques such as co-molding or adhesives, for example. Alternatively, the valves 40 may be removable and replaceable to facilitate cleaning or use with different types of products 180.

Figure 4:
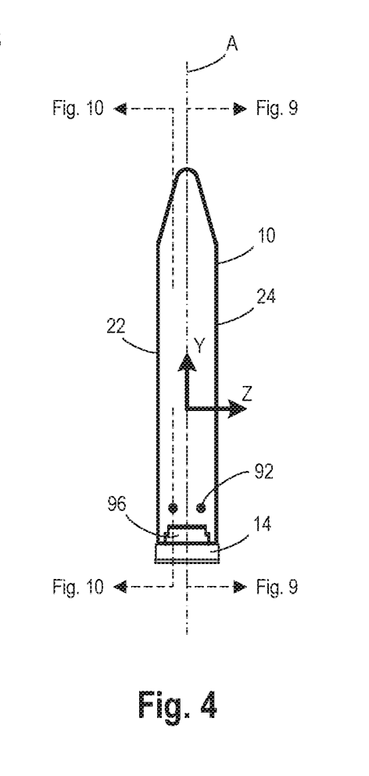
FIG. 4 is a side view of a dispenser in accordance with some embodiments of the presently disclosed subject matter.
Figure 5A:
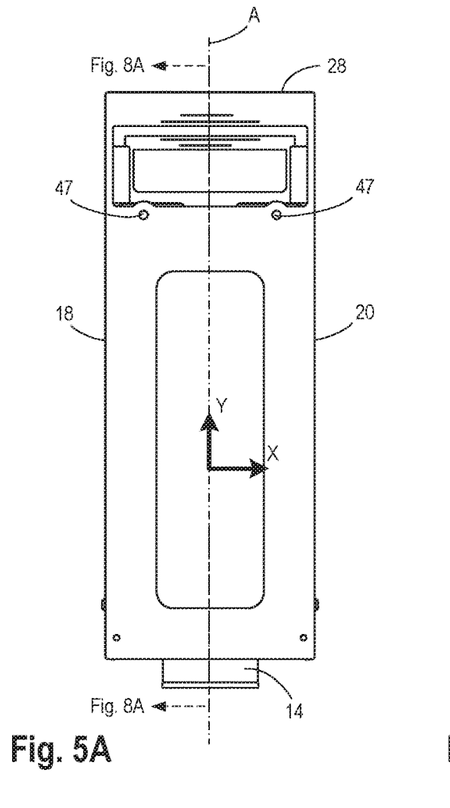
FIG. 5A is a front view of a dispenser with an actuator disposed at a home position in accordance with some embodiments of the presently disclosed subject matter.
Figure 5B:
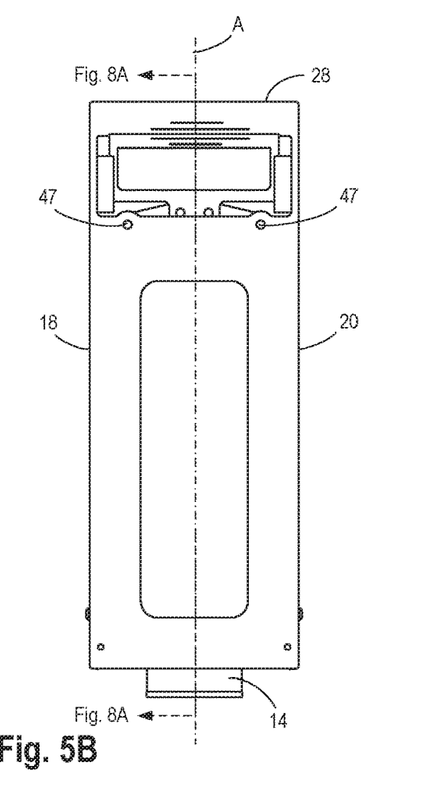
FIG. 5B is a front view of a dispenser with an actuator disposed at a dispensing position in accordance with some embodiments of the presently disclosed subject matter.

The relative width and depth of the dispenser 5 are most clearly visible in FIGS. 4 and 5A-5B, where it can be seen that the distance between sides 22 and 24 is smaller than a distance between the sides 18 and 20. Each of FIGS. 4, 5A & 5B show a longitudinal axis A running the length of the dispenser 5 from the actuating end 17 to the dispensing end 15. The longitudinal axis A runs down a center of the dispenser 5, and defines the intersection of perpendicular planes extending parallel and normal to the page. For instance, in FIG. 4, the Y-Z plane is parallel to the page while the X-Y plane bisects the dispenser 5 along the longitudinal axis A. Notably, the dispenser is symmetric about the X-Y plane. Similarly, in FIGS. 5A-5B, the X-Y plane is parallel to the page while the Y-Z plane bisects the dispenser 5 along the longitudinal axis A. Notably, the dispenser is also symmetric about the Y-Z plane. Also as discussed, the dispenser 5 includes a body 10 and magazine 11 with an asymmetric cross section taken through plane X-Z. Because of the symmetry illustrated in FIGS. 4 & 5A-5B, the left side view shown in FIG. 4 may look substantially identical to the right side of the dispenser 5. Similarly, the front side view in FIGS. 5A & 5B may look substantially identical to the rear side of the dispenser 5.

As shown in FIGS. 5A & 5B, a grip 28 and actuator 30 extend from the actuator end 17 of the dispenser 5. Furthermore, in this illustrated embodiment, the grip 28 and actuator 30 span, bridge, or extend across and between the narrows sides 18, 20 of the actuator. In an alternative embodiment, the grip and actuator 30 extend across and between the wide sides 22, 24 of the actuator 5. In the illustrated embodiment, the grip 28 does not move, pivot or change orientation with respect to the body 10. The actuator 30 is displaceable towards the grip 28 (see e.g., FIG. 5B) by applying a squeezing force, e.g., by the hands of an operator. The actuator 30 is coupled to a ratcheting drive mechanism that causes a squeeze pusher 32 to move towards the dispensing end 15, thus applying pressure to the pouch 175 and causing the product 180 to exit the spout 178 at the dispensing end 15 of the dispenser 5. As used herein, the term "squeeze pusher" is intended to refer to a pusher, compressor, or any structure or body having a rigid or semi-rigid construction that is urged in a direction from the actuator end 17 of the dispenser 5 towards a dispensing end 15 of the dispenser 5 while pushing against, sliding along, or otherwise compressing the contents of the pouch 175 for the purpose of increasing pressure of the product 180 in the pouch 175 thereby causing the product 180 to dispense from a dispensing end 15 of the dispenser 5.

Figure 6A:
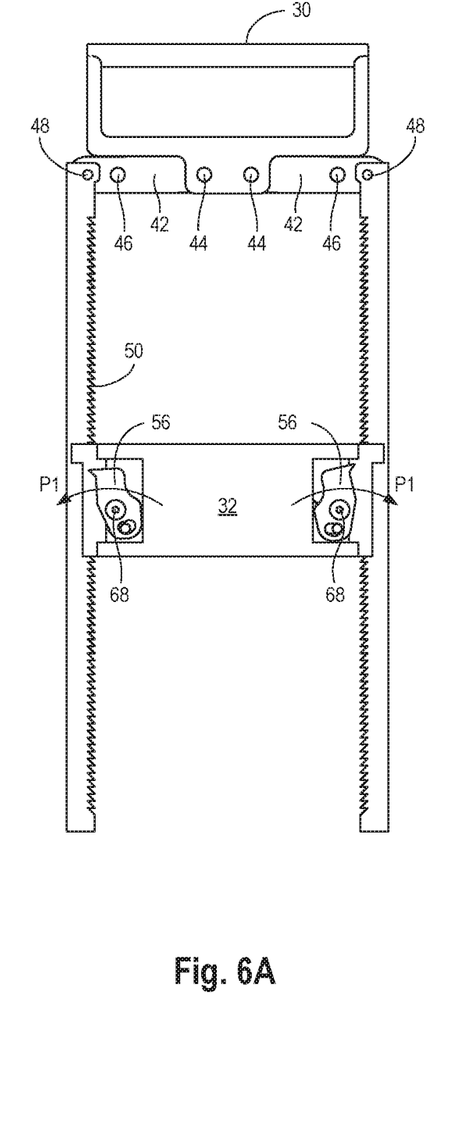
FIG. 6A is a simplified mechanical front view of a ratcheting drive system at a home position in accordance with some embodiments of the presently disclosed subject matter.
Figure 6B:
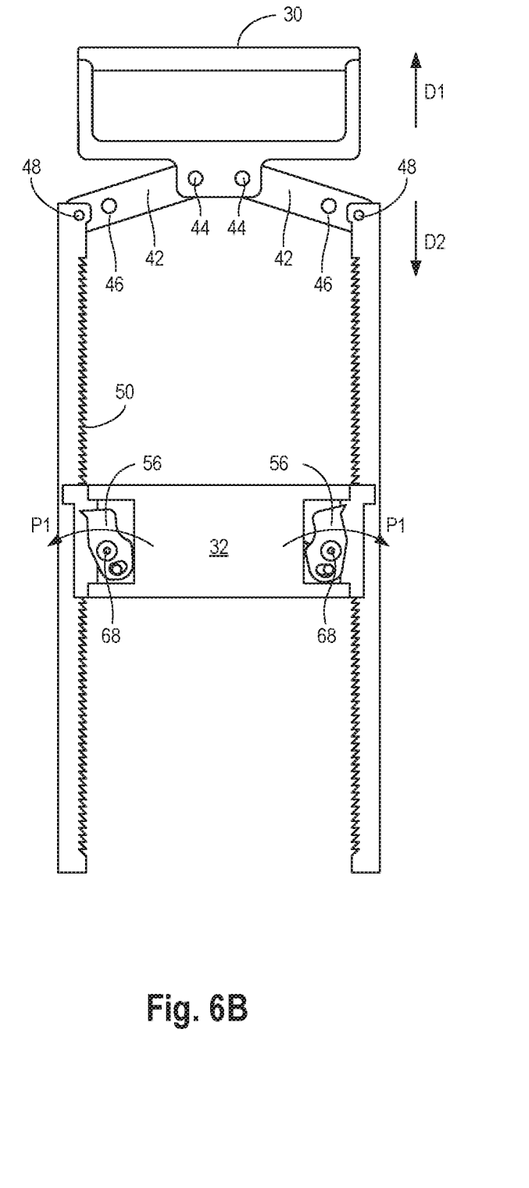
FIG. 6B is a simplified mechanical front view of a ratcheting drive system at a dispensing position in accordance with some embodiments of the presently disclosed subject matter.
Figure 7A:
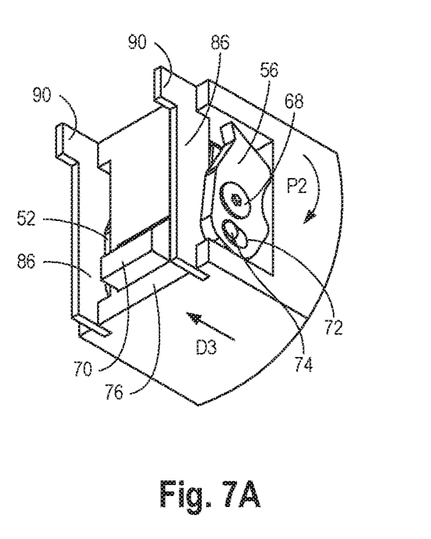
FIG. 7A is a partial detail view of drive and retainer pawls of a squeeze pusher in a retracted position in accordance with some embodiments of the presently disclosed subject matter.
Figure 7B:
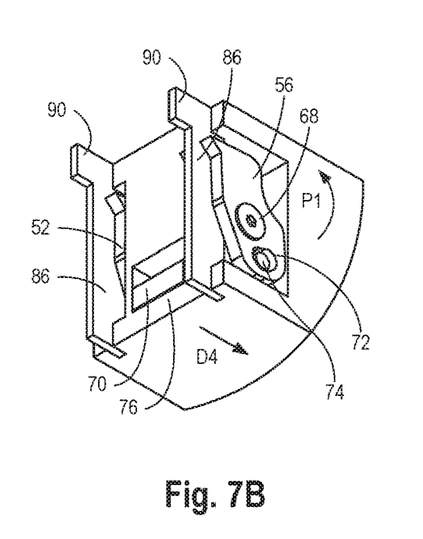
FIG. 7B is a partial detail view of drive and retainer pawls of a squeeze pusher in an engaged position in accordance with some embodiments of the presently disclosed subject matter.
Figure 8A:
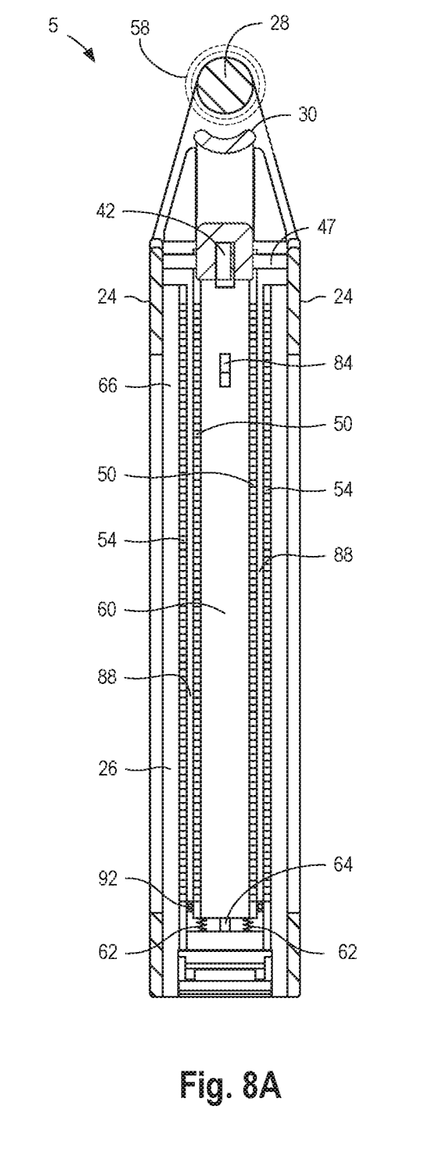
FIG. 8A is a side section view of a dispenser with an actuator disposed at a home position in accordance with some embodiments of the presently disclosed subject matter.
Figure 8B:
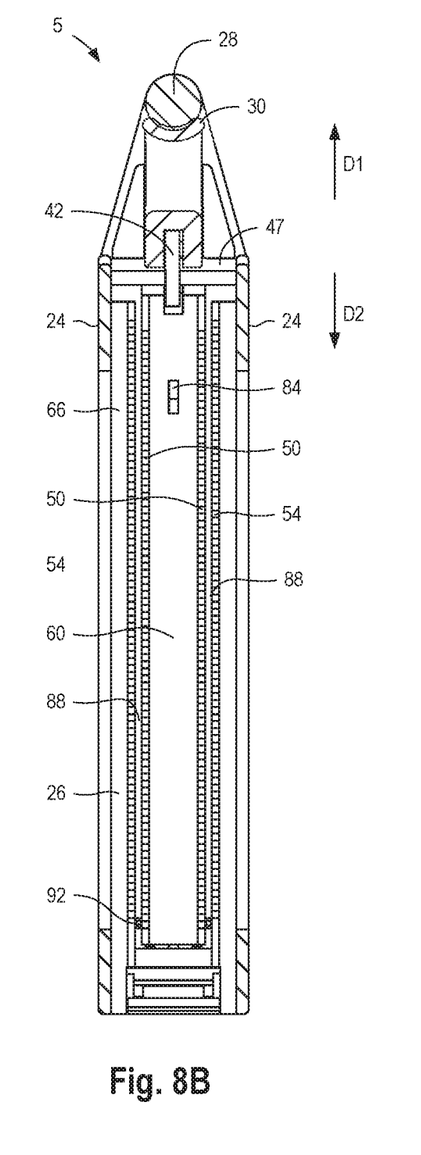
FIG. 8B is a side section view of a dispenser with an actuator disposed at a dispensing position in accordance with some embodiments of the presently disclosed subject matter.

The mechanism by which the actuator 30 causes the squeeze pusher 32 to move is illustrated more clearly in the simplified mechanical drawings in FIGS. 6A & 6B, the detail views in FIGS. 7A & 7B, and the section views of FIGS. 8A & 8B. FIGS. 6A and 6B represent similar front views as those shown in FIGS. 5A and 5B, but with the outer body 10 and magazine 11 removed for clarity. Similarly, the magazine 11 and squeeze pusher 32 are removed in FIGS. 8A & 8B for clarity. In general, the drive mechanism includes a set of driver teeth 50 that incrementally propel the squeeze pusher 32 to compress the pouch 175, and a set of retainer teeth 54 that hold the squeeze pusher 32 in the new upstream position. The teeth 50, 54 engage pawls 52, 56 located on the squeeze pusher 32. Together, the driver teeth and pawls and the retainer teeth and pawls cooperate to function as a one-way, ratcheting drive system. That is, in normal use during product dispensing, the squeeze pusher 32 moves incrementally from the actuating end 17 to the dispensing end 15, with little or no backwards movement, upon each trigger of the actuator 30.

In the illustrated embodiment, the actuator is coupled to lever arms 42 at inner pivot points 44. The lever arms 42 are rotatably coupled to body 10 at stationary pivot points 46. Here, the term stationary is used to indicate motion relative to the body 10. Thus, the lever arms 42 merely rotate about stationary pivot points 46, such as about pins 47 shown in FIGS. 2 and 8A-8B. The outer ends of the lever arms 42 opposite the inner pivot points 44 are coupled to a driver body 60 at outer pivot point 48. Since the lever arms 42 are constrained to rotational movement about stationary pivot points 46, moving the actuator 30 in the direction of arrow D1 will produce an opposite movement of the driver body 60 in the direction of arrow D2. As will be described in greater detail below, the driver body 60 includes driver teeth 50 that are engaged with driver pawls 52 on the squeeze pusher 32 (see e.g., FIGS. 7A & 7B). Thus, during each actuation, the squeeze pusher 32 also moves with the driver body 60 in the dispensing direction (direction of arrow D2).

In one or more embodiments, the distance between the inner pivot points 42 and the stationary pivot points 46 may be greater than the distance between the stationary pivot points 46 and the outer pivot points 48. With such a difference in lengths, the lever arms 42 may provide a mechanical advantage in operating the actuator 30 to move the squeeze pusher 32 to compress the pouch 175. That is, the force required to move the actuator 30 during a dispensing actuation is less than the propelling force applied by the driver teeth 50 to the squeeze pusher 32. The force multiplier is a function of the difference in length of the lever arms 42 on opposite sides of a fulcrum at stationary pivot points 46. In one embodiment, the ratio of the distance between the inner pivot points 42 and the stationary pivot points 46 to the distance between the stationary pivot points 46 and the outer pivot points 48 is between about 3:1 and 5:1. In one embodiment, this ratio is about 4:1. In other embodiments, no mechanical advantage is offered so that the ratio is about 1:1. Of course, the tradeoff with a mechanical advantage at the lever arms 42 is that the distance traveled by driver teeth 50 and squeeze pusher 32 is proportionally less than the amount of actuator 30 movement. Thus, the amount of mechanical advantage may be modified to strike an optimum balance between ease of actuation and volume of product dispensed.

In one or more embodiments, the mechanical advantage ratio maybe set so that a maximum desired movement of the squeeze pusher 32 in the direction of arrow D2 is achieved with each actuation. Then, for instance, if some lesser movement of the squeeze pusher 32 is desired, this can be accomplished by limiting the actuator 30 travel during the dispensing action. Since the actuator 30 travel determines, in part, the volume of product 180 dispensed, different travel limits might be desirable for dispensing for different products 180. FIG. 8A shows a series of concentric rings around the grip 28 that represent travel limiters 58 that could be attached or otherwise secured to the grip 28 to limit the actuator 30 travel. The travel limiters 58 may be implemented as a collar that is snapped in place, or as one or more attachments, or as an integrated adjustment feature. Those skilled in the art will appreciate a number of means for implementing a travel limiter 58 on the actuator, including perhaps attaching such limiters 58 to the actuator 30 instead of the grip 28.

FIGS. 6A, 6B, 8A, and 8B show that the driver teeth 50 are formed on a driver body 60 that is coupled to the lever arms 42 at outer pivot point 48. In the illustrated embodiment, the driver body 60 includes two rows of driver teeth 50 separated by a distance that positions the driver teeth 50 towards the corners of the interior 26 where the narrow sides 18, 20 meet wide sides 22, 24 (see also FIG. 2). As described above, the driver body 60 and driver teeth 50 move downward in the direction of arrow D2 with each actuation of actuator 30. The driver body 60 and actuator 30 can be urged back to the home position by one or more biasing members 62. In the illustrated embodiment, the biasing members 62 are implemented as coil springs located at the end of the driver body 60 opposite the actuator 30. Biasing members can be incorporated at other locations, such as at the opposite end of the driver body 60, at the lever arms 42, or at the actuator 30. FIG. 8A shows that the biasing members are extended while FIG. 8B shows that the biasing members are compressed. Upon releasing the actuator 30, the biasing members 62 push the driver body 60 (and driver teeth 50) back to the home position in the direction of arrow D1, which rotates the lever arms 42 and brings the actuator 30 to its home position where it is spaced away from the grip 28. The motion of the driver body 60 may be constrained with one or more guides 64. In the illustrated embodiment, the guide 64 is implemented as a pin that engages a hole (not shown) in the driver body 60 with an appropriate clearance, running or sliding fit. In other embodiments, the guide 64 may use keying features, dovetails, or other mechanically engaging features to constrain the driver body 60 so that it moves back and forth in a linear fashion along the direction of arrows D1 & D2.

FIGS. 2, 8A, and 8B show a separate set of retainer teeth 54 near the driver body 60 and driver teeth 50. Unlike the driver teeth 50, the retainer teeth 54 do not move. The retainer teeth 54 may be formed or secured to the inside surface 66 of the narrow sides 18, 20. In the illustrated embodiment, there are two rows of retainer teeth 54, each row located outside of the driver teeth 50 and closer to the corners where the narrow sides 18, 20 meet wide sides 22, 24. An advantage to having the teeth located in the corners is that the pouch 175 is less likely to come into contact with the teeth 50, 54, which may reduce the risk of piercing or tearing the pouch 175.

The driver teeth 50 and retainer teeth 54 cooperate to progressively move the squeeze pusher 32 through the interior 26 of the body 10 and magazine 11 from the actuator end 17 to the dispensing end 15. FIGS. 2, 6A, 6B, and 7A, 7B most clearly show a set pawls 52, 56 that are pivotably coupled to the squeeze pusher 32 at pawl pivot point 68. The driver pawls 52 are positioned inward of the retainer pawls 56 and configured to engage with the driver teeth 50 when the squeeze pusher 32 is positioned in the interior 26 of the body 10 and magazine 11. Similarly, the retainer pawls are located so that they engage the retainer teeth 54. Each of the pawls 52, 56 are biased, such as with a coil spring or torsion spring, so that the ends of the pawls 52, 56 normally engage the corresponding teeth 50, 54. Each of the pawls 52, 56 are independently pivotable about pawl pivot point 68. Even though the pawls 52, 56 are biased in the direction of arrows P1 shown in FIGS. 6A & 6B, each are able to pivot in the opposite direction to disengage from the teeth 50, 54. In an alternative embodiment, the pawls 52, 56 may be linearly displaceable relative to the squeeze pusher 32. In order to permit one-way movement of the squeeze pusher 32 through the interior 26, the pawls 52, 56 may be angled, such as towards the actuating end 17, to substantially prevent backwards movement.

During a dispensing cycle, the actuator 30 is moved as described above towards the grip 28, which causes a corresponding movement of the driver teeth 50 towards the dispensing end 15. Since the driver teeth 50 are engaged with the driver pawls 52, the squeeze pusher 32 is also pushed toward the dispensing end 15. This motion of the squeeze pusher 32 will apply pressure to the pouch 175 and cause the product to exit the spout 178 at the dispensing end 15. As the squeeze pusher 32 moves to a new position in direction D2, the retainer pawls 56 are able to rotate about pawl pivot point 68 to disengage and slide over retainer teeth 54 until the actuator movement is complete. At which point, the retainer pawls 56 engage the retainer teeth 54 to prevent the squeeze pusher 32 from moving backwards in the direction of arrow D1. With the squeeze pusher 32 held in place by the retainer pawls 56 engaged with the retainer teeth 54, the biasing members 62 push the driver body 60 and driver teeth 50 back in the direction of arrow D1. Since the driver pawls 52 are independently rotatable about pawl pivot point 68, the driver pawls 52 are able to disengage from the driver teeth 50, thus allowing the driver body 60, the driver teeth 50, and the actuator 30 to return to their home position.

In some instances during a dispensing cycle, the pressure applied to the pouch 175 to dispense the product 180 may remain and cause excess product 180 to emerge or continue emerging from the spout 178. Therefore, in one or more embodiments, the pitch on retainer teeth 54 may be designed to allow the squeeze pusher 32 to move slightly backwards towards the actuator end 17, thus alleviating some of the built up pressure. In some embodiments, the driver teeth 50 and retainer teeth 54 may have a similar size and pitch, but can be offset or out of phase from each other. In some embodiments, the driver teeth 50 and retainer teeth 54 may have a different size or pitch from each other. More generally, the driver teeth 50 and the retainer teeth 54 may have different tooth profiles, which may be defined, for example, by the shape, size, angle, pitch, or location of the teeth on the different rows of teeth 50, 54. Rows of driver teeth 50 may have a first common tooth profile while rows of retainer teeth 54 may have a second common tooth profile that is the same or different than the first tooth profile. For example, the retainer teeth 54 may have fewer teeth per linear distance than the driver teeth 50. This may ensure that forward motion of the squeeze pusher 32 is provided with each dispenser actuation while allowing for the possibility that the squeeze pusher 32 might need to retract some small amount at the end of the dispenser actuation.

In the illustrated embodiment, there are two rows of driver teeth 50 and two rows of retainer teeth 54 disposed at the inside of each narrow wall 18, 20 of the dispenser 5. Moreover, pairs of the driver teeth 50 are coupled to each other on a common driver body 60 and movement of the driver teeth 50 is caused by actuator 30 movement rotating a lever arm 42. Notably, this arrangement exists at both narrow sides 18, 20 of the dispenser 5, each lever arm 42 operated by a single actuator 30. Consequently, the force distribution is also symmetric. That is, substantially similar drive forces are applied to opposite sides the squeeze pusher 32 and to opposite sides of the pouch 175. Thus, the squeeze pusher 32 is much less likely to tilt and is able to more effectively compress the pouch 175. Furthermore, the plurality of driver teeth 50 are moved with a single common actuator 30. In one embodiment, two driver teeth 50 are moved by a single lever arm 42. In another embodiment, a single lever arm 42 may move a single row of driver teeth 50 at each lateral side 18, 20 of the dispenser 5. Similarly, a single row of retainer teeth 54 may be disposed at each lateral side 18, 20 of the dispenser 5. In another embodiment, the dispenser 5 may include two rows of driver teeth 50 disposed at the lateral sides 18, 20 of the dispenser, with each row of driver teeth 50 moved by its own respective lever arm 42. For instance, the dispenser 5 may include four rows of driver teeth 50 driven by four lever arms 42. In general, the actuator 30 drives a plurality of lever arms 42. The dispenser 5 may include more or fewer rows of driver teeth 50 and retainer teeth 54 than the illustrated embodiments. Further, the teeth 50, 54 may be arranged so they are disposed inside of the wide sides 22, 24 of the dispenser 5.

Figure 9A:
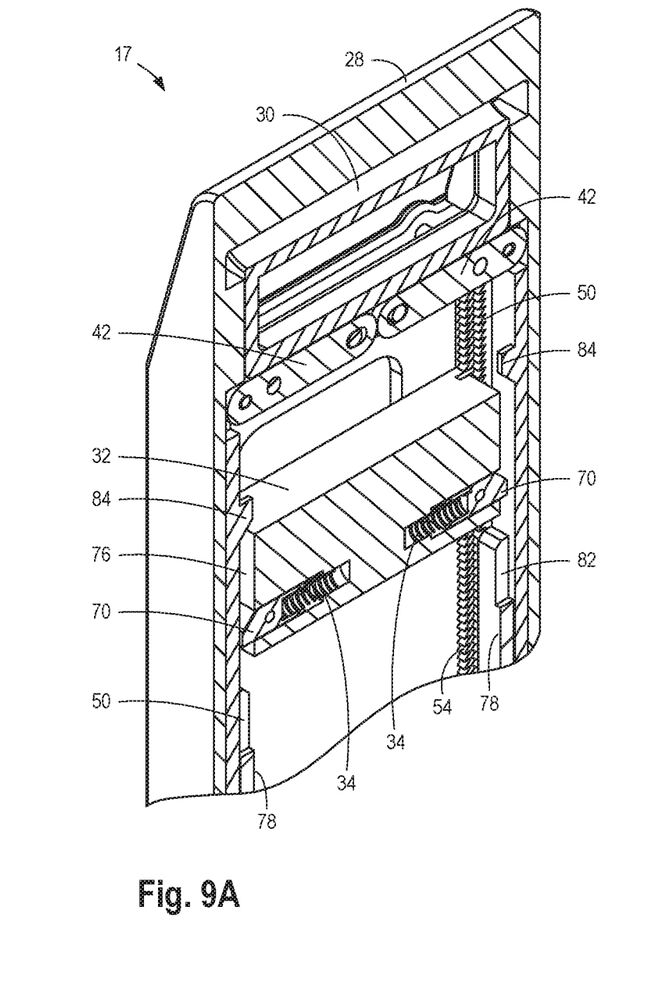
FIG. 9A is a partial isometric section view of a dispenser with a squeeze pusher disengaged from a ratcheting drive system in accordance with some embodiments of the presently disclosed subject matter.

FIGS. 7A and 7B show a more detailed view of the pawls 52, 56 on the squeeze pusher 32. As indicated above, the pawls 52, 56 are pivotable about pawl pivot point 68. The extent of pivot travel for the pawls 52, 56 is limited by slot 72 and pin 74. In the embodiment shown, each pawl 52, 56 includes a slot 72 and each set of pawls 52, 56 may have a corresponding pin 74 to control the position and/or motion of the pawls 52, 56. The slot 72 is wider than the pin 74 to allow the pawls 52, 56 to disengage from the teeth 50, 54 during the dispensing cycle described above. During normal dispensing of product 180 using dispenser 5, the pawls 52, 56 are positioned as shown in FIG. 7B, where the pawls are biased in the direction of arrow P1, which allows the pawls 52, 56 to engage the corresponding teeth 50, 54. However, once a pouch 175 is empty or a user otherwise needs to move the squeeze pusher 32 from the dispensing end 15 towards the actuator end 17, the pawls 52, 56 can be retracted from the corresponding teeth 50, 54 as indicated by the direction of arrow P2 shown in FIG. 7A. The pawls 52, 56 may be retracted or extended by a pawl controller 70. The pawl controller 70 is a moveable component, extending laterally out from both sides 76 of the squeeze pusher 32. The pawl controller 70 maybe urged outward in the direction of arrow D3 by a spring or other biasing element 34 (see FIGS. 9A & 9B) so that it normally extends outward as shown in FIGS. 7A and 9A. The pin 74 may be coupled to the pawl controller 70 so that it also moves in the direction of arrow D3 in FIG. 7A or in the direction of arrow D4 in FIG. 7B. When the pawl controller 70 is allowed to extend laterally outward, the pin 74 moves outward with the pawl controller 70, and engages the slot 72 to rotate the pawls 52, 56 in the direction of arrows P2. In this retracted position, the pawls 52, 56 are disengaged from the corresponding teeth 50, 54 and are free to slide forward towards the dispensing end 15 or backwards towards the actuator end 17, such as for resetting the dispenser 5 for further dispensing. If the pawl controller 70 is pushed inward so that it is flush with the sides 76 of the squeeze pusher 32, the pin 74 also moves in the direction of arrow D4, disengaging from the slot 72, and allowing the pawls 52, 56 to move to their normal home position biased in the direction of arrow P1. In this extended position, the pawls 52, 56 are re-engaged with the corresponding teeth 50, 54 for continued dispensing cycles.

In the illustrated embodiment, the squeeze pusher 32 includes a set of rails 86 that guide the travel of the squeeze pusher 32 within the interior 26 of the body 10 and magazine 11. The rails 86 may be positioned into the slots 88 formed between the driver teeth 50 and retainer teeth 54 (best seen in FIGS. 8A & 8B). The rails 86 include a rail extension 90 that, along with rail stops 92 shown clearly in FIGS. 10A & 10B, captivate the squeeze pusher 32 within the rails. As the squeeze pusher 32 moves towards the dispensing end 15 as shown in FIG. 10B, the rail extensions 90 will contact the rail stops 92 to prevent the squeeze pusher 32 from falling out of the body 10. The rail stops 92 may be removable to allow the squeeze pusher 32 to be removed from the interior 26 of the body 10 and magazine 11, such as for assembly, cleaning, or service. However, during normal use dispensing product 180 with dispenser 5, it may be desirable to keep the squeeze pusher retained within the body 10, even when replacing the magazine 11 and/or pouch 175. The rail stops 92 may be implemented using screws, setscrews pins, rivets, or other mechanical protrusions. The rails 90 may be implemented using wear resistant materials such as coated or anodized aluminum, Nylon, Delrin, stamped or laser cut sheet metal, and the like. In an alternative embodiment, the rails 86 may be positioned within a slot formed by other features in the body 10 or magazine 11, such as between ribs or recesses (not shown) formed at the outer walls 18, 20.

When the squeeze pusher 32 is positioned within the interior 26 of the body 10 and magazine 11, the pawl controller 70 is pushed inward by a sidewall 78 of the magazine 11 to allow the pawls 52, 56 to engage the corresponding teeth 50, 54 for normal dispensing cycles. The sidewall 78, best seen in FIG. 2, is connected to the end plate 16 at a dispensing end 15 of the magazine 11. The end of the sidewall 78 opposite the end plate 16 is cantilevered so that the magazine 11 may be inserted and removed from the body 10, sliding past the squeeze pusher rails 86 in the process. A pair of magazine slots 80 reside on either side of the sidewall 78, between the sidewall 78 and wider walls 94 of the magazine 11. In the illustrated embodiment, the magazine slots 80 are wide enough to accommodate the driver teeth 50, the retainer teeth 54, the slot 88 between the teeth, and the squeeze pusher rails 86 positioned within the slot 88.

Figure 9B:
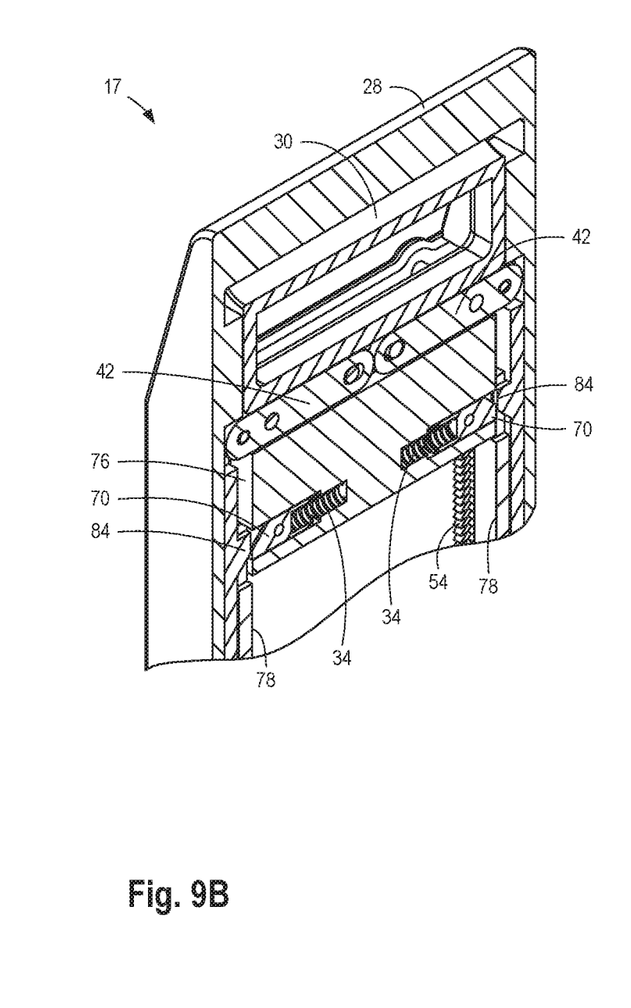
FIG. 9B is a partial isometric section view of a dispenser with a squeeze pusher engaged with a ratcheting drive system in accordance with some embodiments of the presently disclosed subject matter.

The sidewall 78 is sized and configured to automatically engage or disengage the pawl controller 70 upon inserting and removing the magazine 11 from the body 10. FIGS. 9A and 9B illustrate a reset mechanism for moving the squeeze pusher 32 towards the actuator end 17 and resetting the pawls 52, 56 for dispensing product 180. As discussed above, the position of the pawl controller 70 determines whether the pawls 52, 56 are engaged with the corresponding teeth 50, 54. Normally, when the magazine 11 is removed from the body 10, pawl controllers 70 extend outward to disengage the pawls 52, 56. In this configuration, the squeeze pusher 32 is free to slide along the interior 26 of the body 10. FIG. 9A shows the magazine sidewalls 78 out of contact with the squeeze pusher 32 and, specifically the pawl controllers 70. Thus, the pawl controllers 70 are able to extend outwards as shown. When a new pouch 175 is placed within the magazine 11, the pouch 175 and magazine 11 can be inserted into the body 10 and push the squeeze pusher 32 towards the actuating end 17. Once the squeeze pusher 32 moves far enough towards the actuator end 17, the pawl controllers 70 come into contact with a reset protrusion 84 (see also FIGS. 2, 8A & 8B) which pushes the pawl controllers 70 inward to reset the pawls 52, 56 for dispensing. Note that the contacting surfaces of the reset protrusion 84 and pawl controllers 70 may be angled or chamfered to initiate and facilitate the inward movement of the pawl controllers 70.

FIG. 9B shows that as the magazine 11 is pushed further into the body, the sidewalls 78 are able to slide up the sides 76 of the squeeze pusher 32 and into a position in which the pawl controllers 70 are kept in the retracted position by the sidewalls 78, even as the squeeze pusher 32 gets pushed towards the dispensing end 15 during each actuation. Note that the sidewalls 78 include a clearance slot 82 (see also FIG. 2) that allows the sidewall 78 to move past the reset protrusion 84. The clearance slot 82 is narrow and the surfaces of the sidewall 78 on either side of the clearance slot 82 are large enough to engage the pawl controllers 70. The ends of the sidewalls 78 may also be angled or chamfered to facilitate sliding movement past the pawl controllers 70. With the squeeze pusher 32 and magazine 11 configured in this manner, the mere action of completely inserting the magazine 11 into the body 10 resets the position of the squeeze pusher 32 at the actuating end 17 and resets the pawls 52, 56 for dispensing.

Figure 10A:
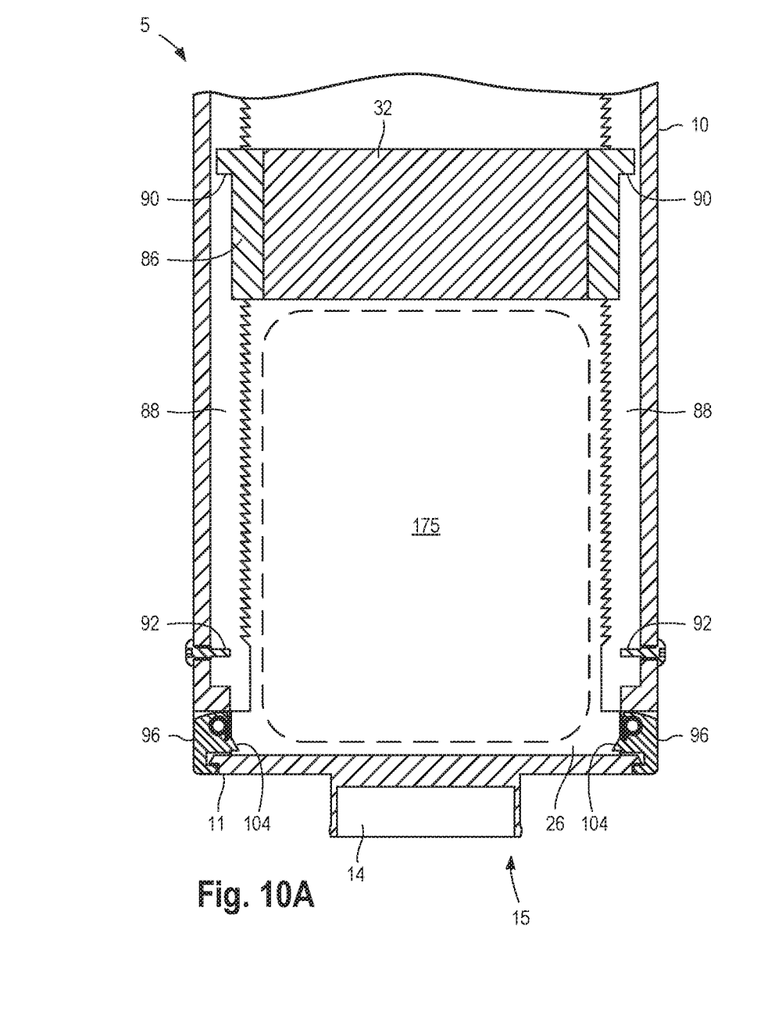
FIG. 10A is a partial front section view of a dispenser with a magazine retained in the dispenser body in accordance with some embodiments of the presently disclosed subject matter.
Figure 10B:
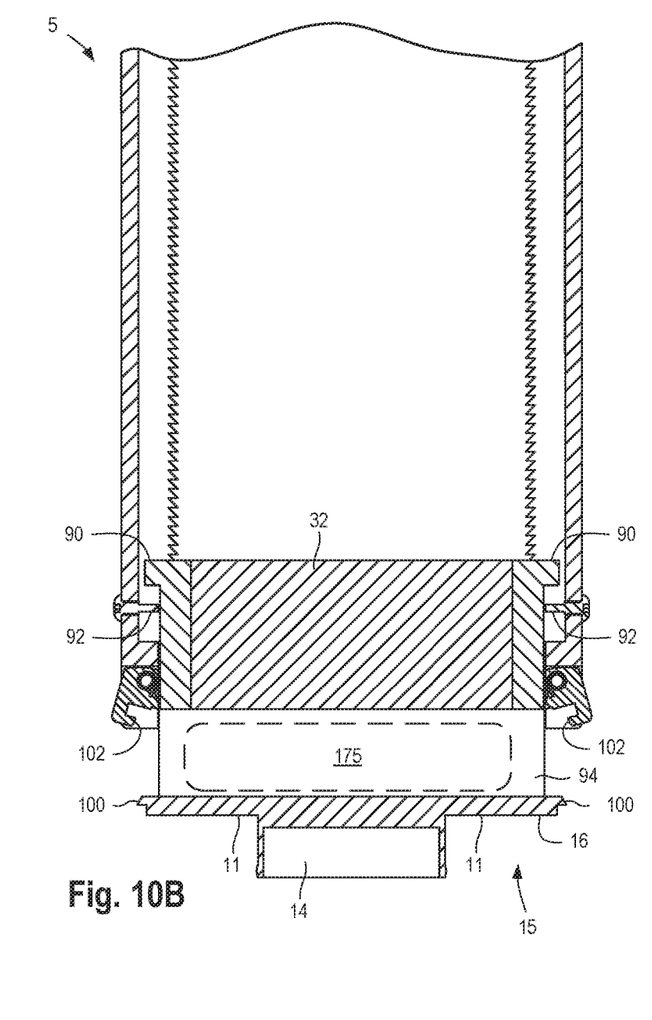
FIG. 10B is a partial front section view of a dispenser with a magazine ejected from the dispenser body in accordance with some embodiments of the presently disclosed subject matter.

Likewise, when the contents of a pouch 175 are emptied and the squeeze pusher 32 has been moved to the dispensing end 15 of the dispenser 5, a release mechanism shown most clearly in FIGS. 10A & 10B automatically ejects the magazine 11 and the emptied pouch 175 from the body 10. During normal product 180 dispensing, the squeeze pusher 32 moves incrementally towards the dispensing end 15 to compress pouch 175. The magazine 11 is secured to body 10 by a pair of opposed latches 96. The latches 96 are pivotably attached to the end of the narrow walls 18, 20. Each latch 96 may be biased, such as with a spring, into the closed position shown in FIG. 10A in which a hook 102 on the latch 96 engages a lip 100 on the end plate 16. Each latch 96 also includes a release protrusion 104 that extends inward towards the interior 26 of the body 10 and into the path of travel of the squeeze pusher 32. Ultimately, the squeeze pusher 32 will move to a point near the dispensing end 15 where the rails 86 on the squeeze pusher 32 come into contact with the release protrusions 104 and cause the pair of opposed latches 96 to open up as shown in FIG. 10B. Once the latches 96 open, the latch hook 102 disengages from the lip 100, thus allowing the magazine 11 and emptied pouch 175 to be removed from the body 10. Note that once the magazine 11 is removed from the body 10, the pawl controllers 70 are able to extend outward, thus disengaging the pawls 52, 56 from the teeth 50, 54. At this point, the magazine 11 may be cleaned as necessary, loaded with a new, filled pouch 175, and the magazine 11 and pouch 175 reinserted into the body 10 to automatically reset the squeeze dispenser 32 for continued product 180 dispensing.

The body 10 and magazine 11 may be designed so that the interior 26 is slightly larger than the volume of a new pouch 175 filled with product 180. Thus, upon inserting the new pouch 175 and magazine 11 into the body 10, it may be necessary to move the squeeze pusher 32 into sufficient contact with the pouch 175 to burst the seal 194. With the teeth 50, 54 and pawls 52, 56 configured as shown and described, the squeeze pusher 32 may be moved from the actuating end 17 to the dispensing end 15 by simply pushing the squeeze pusher 32 in this direction. This is possible even when the pawl controllers 70 are retracted and pawls 52, 56 are engaged with teeth 50, 54. The pawls 52, 56 may simply slide along the rows of teeth 50, 54 until the squeeze pusher 32 is moved to a desired location. So for instance, if a new small pouch 175 or a partially full large pouch 175 is inserted into the magazine, it may be desirable to quickly move the squeeze pusher 32 into contact with the pouch 175 so that dispensing may begin immediately. Otherwise, without this quick adjustment feature, it would be necessary to depress the actuator 30 multiple times to incrementally move the squeeze pusher 32 into the desired position. To facilitate pushing the squeeze pusher 32 from the actuating end 17 to the dispensing end 15, the squeeze pusher 32 may include a protrusion or other manipulation feature 106 that is shown schematically with dashed lines in FIG. 2. The manipulation feature 106 might be accessible through holes or slots in the body 10 and magazine 11. The manipulation feature 106 may protrude through the body 10 and magazine 11. Alternatively, the manipulation feature 106 may be engaged with a key, a pin, an operator's finger and the like. Similarly, the manipulation feature 106 may be disposed on both sides of the squeeze pusher 32.

In an alternative embodiment, the body 10 and magazine 11 may be designed so that the interior 26 is slightly smaller than the volume of a new pouch 175 filled with product 180. This configuration might be desirable because some of the force applied to insert the magazine 11 into the body 10 could work to burst the seal 194 of the pouch 175. If designed in this manner, a new pouch 175 may substantially fill the volume of interior 26 prior to the magazine 11 engaging latches 96. In order to fully insert the magazine 11 into the body, a user can apply an axial force to push the magazine 11 against the pressurized bag 175 with sufficient force to cause the pouch to burst and for the product 180 to begin flowing out of spout 178. A number of different approaches may be used to push the magazine 11 with sufficient force to cause the pouch 175 to burst. For example, a user might push magazine 11 with their hands, or might place the magazine 11 against a surface (e.g., a solid table, or wall) and push the body 10 towards the surface with their arms or using their body weight. Alternatively, the user might use a separate tool, such as a press (e.g., mechanical, hydraulic) to push the magazine 11 with sufficient force to cause the pouch 175 to burst.

The amount by which the body 10 and magazine 11 should be undersized may depend on a number of factors such as product density and seal strength. In one embodiment, the magazine 11 may need to be pushed about 6 mm to 7 mm beyond first contact between the pouch 175 and the squeeze pusher 32 on the actuating side 17 and the magazine 11 on the dispensing side 15. This amount of movement may be sufficient to burst a pouch 175 with many different types of products. In general, the amount of displacement required to build sufficient internal pressure required to burst the pouch is inversely proportional to the density of the product 180 contained therein. For instance, with a highly whipped or foamy product, more displacement may be required to generate the necessary force to burst a pouch containing such product. On the contrary, a pouch containing a highly dense product might require only a small amount of axial displacement to burst the pouch.

Actuator 5 and components therein can be constructed from any suitable rigid or semi-rigid material known in the art, such as metal, wood, rubber, plastic, and the like. Some examples may include aluminum, steel, brass, bronze, tin, polyethylene terephthalate, high density polyethylene, low density polyethylene, polyvinyl chloride, polypropylene, polystyrene, acrylonitrile butadiene styrene, polyamide, polycarbonates, polymer foams, or combinations thereof. Components of actuator 5 can be constructed using any conventional process known in the art, such as rotational molding, blow molding, reheat stretch blow molding, injection molding, casting, roll forming, stamping, and the like. A tubular body 10 may be manufactured by an extrusion process.

In some embodiments, the body 10 and magazine 11 may have a cross sectional shape that is not strictly rectilinear. For instance, the body 10 and magazine 11 may have a an oval or elliptical shape with a distance between the wide sides being smaller than a distance between the narrow sides of the body. More particularly, the shape of the body 10 and magazine should define an interior volume 26 that is similar to the shape of a product-filled pouch 175. Naturally, the interior volume 26 of body 10 and magazine 11 should be large enough to accommodate a product-filled pouch 175. However, it may be desirable to limit the size of the interior 26 so that as the squeeze pusher 32 moves to compress the pouch 175, that compressive force is directed to dispense the product 180 instead of merely allowing the pouch 175 to expand laterally.

In one or more embodiments, the dispenser 5 also includes spout restrictor 108, which reduces the effective width of the aperture 12 through which the spout 178 extends. See for example, the actuator end view shown in FIG. 3. A disadvantage of the flexible pouch 175 and spout 178 is that when the internal pressure on the product 180 begins to build, the pouch 175 and the spout 178 tend to deform or change shape. That is, the initial buildup of dispensing force generated by the squeeze pusher 32 is lost because it merely produces a change in shape of the pouch 175 instead of being applied to burst the frangible seal 194 and/or propel the product 180 out of the pouch 175. During the initial buildup of the compressive forces applied by the squeeze pusher, the spout 178 tends to distort and change shape in a somewhat unpredictable manner as a result of variations in product densities, seal formation, or pouch construction, for example. Quite often, as pressure builds, the spout 178 will deflect to one side or another of a centerline of the pouch 175. In order to burst the frangible seal 194, additional force must be applied by the squeeze pusher 132 to straighten the flexible spout 178, and sufficiently fill the spout 178 so that pressure is applied directly to the frangible seal 194. As with the body of the pouch 175, the spout 178 itself may also be prone to expanding laterally. Allowing the spout 178 to expand results in further loss of the applied force because it merely produces a change in shape of the spout 178 instead of being applied to burst the frangible seal 194. The asymmetric shape of the body helps to constrain this undesirable change in shape and ensure that compressive forces generated by the squeeze pusher 132 are applied to dispense the product 180 instead of merely allowing the pouch 175 to expand laterally. Similarly, the spout restrictor 108 helps to prevent unnecessary expansion or deflection of the spout 178.

The spout restrictor 108 may be implemented as a pair of opposed, arched protrusions narrowing the size of aperture 12. Other shapes and configurations are certainly permissible. That is, the spout restrictor 108 may be formed as protrusions extending inward from the sidewalls of the aperture 12. The sidewalls of the aperture 12 may have a contoured shape to restrict unwanted movement or expansion of the spout 178 or the aperture 12 may simply include a narrow aspect ratio. Moreover, the spout restrictor 108 may be formed onto a separate component or alternatively be formed as part of discharge unit 135, or as part of diffuser 14, or as part of the end plate 16 of magazine 11. If the spout restrictor 108 is a separate component, an operator may place the spout restrictor 108 in the magazine 11 prior to inserting a pouch 175. Alternatively, the spout restrictor 108 may be placed on the pouch 175 with the spout restrictor 108 and pouch 175 inserted into the magazine 11 together. The spout restrictor 108 may include a depth in a direction from the dispensing end 15 to the proximal end 17 that is similar to a length of the spout 178 so that all or a substantial portion of the spout 178 is constrained against unwanted deflection or expansion.

The spout restrictor 108 may be constructed as fixed features or movable features. Because the spout restrictor 108 narrows the aperture 12, it may be desirable to permit lateral movement to temporarily widen the aperture 12, making it easier to insert the spout 178. Similarly, because the spout restrictor 108 may have a depth that extends into the interior 26 of the body, the spout restrictor 108 may be moveable in an axial direction, for example to provide clearance for the pouch 175 and squeeze pusher 32 when the pouch 175 is nearly empty. Alternatively, relief or clearance features may be incorporated into the squeeze pusher 32 to accommodate the restrictors 108.

IV. Methods of Using the Disclosed System

Dispenser 5 can dispense product 180 through valve 40 of discharge unit 35 onto a surface (such as a hamburger bun). Initially, a pouch 175 filled with product 180 is inserted into the interior 26 of the magazine 11. A spout 178 of the pouch 175 can be guided through an aperture 12 in the end plate 16. Next, magazine 11 with the filled pouch 175 are inserted into the dispensing end 15 of body 10. The magazine 11 is inserted until the squeeze pusher 32 is reset and the magazine 11 is latched into place by latches 96. To dispense product 180 disposed within pouch 175, an operator squeezes the actuator 30 as described above and causes the squeeze pusher 32 to push against and increase pressure within the pouch 175 to dispense product 180 through valve 40. With each subsequent actuation, the squeeze pusher 32 moves from an actuator end 17 of the dispenser 5 towards a dispensing end 15 of the actuator 5.

The magazine 11 is a removable component of the dispenser 5 and is simple in its construction, partly because it has no moving parts. Thus, it may be desirable and even advantageous to use a system that includes a plurality of magazines 11 for each dispenser body 10. For example, a restaurant may wish to have a plurality of magazines 11, each filled with additional pouches 175 of a common product 180 as additional inventory for busy operating hours. As one pouch is emptied and the magazine 11 is automatically ejected from the dispenser 5, the magazine with the used pouch 175 may be place aside for disposing/cleaning and a replacement magazine 11 with a filled pouch 175 can be pulled and inserted into the body 10 to continue dispensing product 180. Alternatively, the system of a plurality of magazines 11 per each body 10 may include magazines 11 filled with pouches 175 having different products 180. In order to switch products 180, the latches 96 can be manually pivoted outward to release the magazine 11 prior to completely emptying a first pouch 175. Then, an operator may place the first product magazine 11 in a desired storage location for further use at a later time and insert a second product magazine 11 to dispense the second product 180.

V. Advantages of the Presently Disclosed Subject Matter

In some embodiments, the presently disclosed subject matter lowers costs associated with materials and assembly with sufficient ruggedness to survive filling, closing, packing and shipping.

The dispenser further allows the dispensing of multiple doses of product in each dispensing application.

In addition, the disclosed system is easy to reload and requires no/minimal cleaning between reloads.

The disclosed dispenser has a reduce size that closely matches the size and shape of a product pouch.

The disclosed dispenser includes a rectilinear shaped body to permit stacking of the dispenser.

The disclosed dispenser includes a symmetric shape to permit easier use in crowded kitchens, or by multiple operators, especially with operators that may be right or left handed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:
1. A dispenser comprising:
   a body comprising an actuator end and a dispensing end and a plurality of walls defining an interior space, the body including an asymmetric shape wherein a distance between opposed first and second walls is greater than a distance between opposed third and fourth walls of the body;
   a grip extending from the actuator end and being coupled to and spanning a distance between the first and second walls;
   an actuator movably attached to the body and biased to a home position away from the grip and movable from the home position towards the grip;
   a first row of driver teeth extending longitudinally at an interior of the first wall, the first row of driver teeth movably coupled to the actuator with a first lever such that upon moving the actuator towards the grip, the first row of driver teeth moves towards the dispensing end;
   a second row of driver teeth extending longitudinally at an interior of the second wall, the second row of driver teeth movably coupled to the actuator with a second lever such that upon moving the actuator towards the grip, the second row of driver teeth moves towards the dispensing end; and
   a squeeze pusher disposed within the interior space of the body, the squeeze pusher comprising a first driver pawl movably attached to the squeeze pusher and engageable with the first row of driver teeth and a second driver pawl movably attached to the squeeze pusher and engageable with the second row of driver teeth;
   wherein when the actuator is moved from the home position towards the grip, the first and second rows of driver teeth respectively engage the first and second driver pawls and cause the squeeze pusher to move relative to the body from a first position to a second position in a direction from the actuator end to the dispensing end;
   wherein the dispenser further comprises:
      a first row of retainer teeth fixedly extending longitudinally at the interior of the first wall,
      a second row of retainer teeth fixedly extending longitudinally at the interior of the second wall,
      wherein the squeeze pusher further comprises a first retainer pawl movably attached to the squeeze pusher and engageable with the first row of retainer teeth and a second retainer pawl movably attached to the squeeze pusher and engageable with the second row of retainer teeth,
      wherein after the actuator is moved from the home position towards the grip, the first and second retainer pawls respectively engage the first and second rows of retainer teeth to retain the squeeze pusher at the second position, and
      wherein after the actuator is moved from the home position towards the grip, the actuator returns to the home position and the first and second rows of driver teeth respectively disengage the first and second driver pawls and return towards the actuating end.

2. The dispenser of claim 1 wherein the first and second rows of driver teeth are disposed at opposite sides of the interior space.

3. The dispenser of claim 1 wherein the first and second rows of retainer teeth are disposed at opposite sides of the interior space.

4. The dispenser of claim 1 wherein the first and second rows of driver teeth have a common first tooth profile, the first and second rows of retainer teeth have a common second tooth profile that is different than the first tooth profile.

5. The dispenser of claim 1, further comprising:
a third row of driver teeth extending longitudinally at the interior of the first wall, the third row of driver teeth movably coupled to the actuator with the first lever such that upon moving the actuator towards the grip, the third row of driver teeth moves towards the dispensing end;
a fourth row of driver teeth extending longitudinally at the interior of the second wall, the fourth row of driver teeth movably coupled to the actuator with the second lever such that upon moving the actuator towards the grip, the fourth row of driver teeth moves towards the dispensing end;
a third row of retainer teeth fixedly extending longitudinally at the interior of the first wall; and
a fourth row of retainer teeth fixedly extending longitudinally at the interior of the second wall.

6. The dispenser of claim 5 wherein:
the first and third rows of driver teeth are coupled to each other on a first driver body that is coupled to the first lever; and
the second and fourth rows of driver teeth are coupled to each other on a second driver body that is coupled to the second lever.

7. The dispenser of claim 5 wherein:
the first row of driver teeth and the first row of retainer teeth are disposed at a first corner of the interior space;
the second row of driver teeth and the second row of retainer teeth are disposed at a second corner of the interior space;
the third row of driver teeth and the third row of retainer teeth are disposed at a third corner of the interior space; and
the fourth row of driver teeth and the fourth row of retainer teeth are disposed at a fourth corner of the interior space.

8. The dispenser of claim 1 further comprising an actuator limiter disposed between the actuator and the grip, the actuator limiter limiting the distance the squeeze pusher moves relative to the body.

9. A dispenser comprising:
a body comprising an actuator end and a dispensing end and a plurality of walls defining an interior space, the body including an asymmetric shape wherein a distance between opposed first and second walls is greater than a distance between opposed third and fourth walls of the body;
a grip extending from the actuator end and being coupled to and spanning a distance between the first and second walls;
an actuator movably attached to the body and biased to a home position away from the grip and movable from the home position towards the grip;
a first row of driver teeth extending longitudinally at an interior of the first wall, the first row of driver teeth movably coupled to the actuator with a first lever such that upon moving the actuator towards the grip, the first row of driver teeth moves towards the dispensing end;
a second row of driver teeth extending longitudinally at an interior of the second wall, the second row of driver teeth movably coupled to the actuator with a second lever such that upon moving the actuator towards the grip, the second row of driver teeth moves towards the dispensing end; and
a squeeze pusher disposed within the interior space of the body, the squeeze pusher comprising a first driver pawl movably attached to the squeeze pusher and engageable with the first row of driver teeth and a second driver pawl movably attached to the squeeze pusher and engageable with the second row of driver teeth;
wherein when the actuator is moved from the home position towards the grip, the first and second rows of driver teeth respectively engage the first and second driver pawls and cause the squeeze pusher to move relative to the body from a first position to a second position in a direction from the actuator end to the dispensing end;
wherein the dispenser further comprises a removable magazine sized and shaped to fit within the body, the magazine being insertable into the body from the dispensing end, the body and the magazine defining the interior space.

10. The dispenser of claim 9 wherein the magazine comprises a spout aperture at the dispensing end, the spout aperture including a restrictor.

* * * * *